(12) United States Patent
Nagata

(10) Patent No.: US 8,517,587 B2
(45) Date of Patent: Aug. 27, 2013

(54) LIGHT SOURCE DEVICE AND DISPLAY UNIT EQUIPPED WITH LIGHT SOURCE DEVICE

(75) Inventor: Yasunari Nagata, Yasu (JP)

(73) Assignee: Kyocera Corporation, Kyoto (JP)

( * ) Notice: Subject to any disclaimer, the term of this patent is extended or adjusted under 35 U.S.C. 154(b) by 288 days.

(21) Appl. No.: 12/994,465

(22) PCT Filed: May 29, 2009

(86) PCT No.: PCT/JP2009/059901
§ 371 (c)(1),
(2), (4) Date: Nov. 24, 2010

(87) PCT Pub. No.: WO2009/145319
PCT Pub. Date: Dec. 3, 2009

(65) Prior Publication Data
US 2011/0103094 A1     May 5, 2011

(30) Foreign Application Priority Data

May 29, 2008   (JP) .................................. 2008-140620
Jun. 26, 2008   (JP) .................................. 2008-167687

(51) Int. Cl.
*F21V 7/04* (2006.01)
(52) U.S. Cl.
USPC ........... 362/606; 362/600; 362/613; 362/615; 362/624; 362/625; 362/627
(58) Field of Classification Search
USPC ................. 362/600, 606, 613, 615, 625, 627, 362/624
See application file for complete search history.

(56) References Cited

U.S. PATENT DOCUMENTS
2006/0139960 A1   6/2006   Sakai et al.

FOREIGN PATENT DOCUMENTS

| JP | 4-136623 A | 5/1992 |
| JP | 9-259623 A | 10/1997 |
| JP | 11-353920 A | 12/1999 |
| JP | 2001-110224 A | 4/2001 |
| JP | 2002-231032 A | 8/2002 |
| JP | 2002-343122 A | 11/2002 |
| JP | 2005-183124 A | 7/2005 |
| JP | 2006-210309 A | 8/2006 |

*Primary Examiner* — Stephen F Husar
*Assistant Examiner* — Meghan Dunwiddie
(74) *Attorney, Agent, or Firm* — Birch, Stewart, Kolasch & Birch, LLP

(57) ABSTRACT

Disclosed is a light source device which is made compact while suppressing increase in non-uniformity of brightness caused by existence of a non-light emitting portion between a plurality of light sources. A light source device is characterized in that a plurality of light diffusers have a first light diffuser located in front of a first light source in the light exit direction closely thereto, and a second light diffuser located in front of a second light source in the light exit direction closely thereto. The first light diffuser includes a first light absorbing material which absorbs visible light emitted from the first light source more easily than visible light emitted from the second light source, and the second light diffuser includes a second light absorbing material which absorbs visible light emitted from the second light source more easily than visible light emitted from the first light source.

8 Claims, 15 Drawing Sheets

(a)

(b)

(a)

(b)

(a)

(b)

(a)

(b)

(a)

(b)

LIGHT SOURCE DEVICE AND DISPLAY UNIT EQUIPPED WITH LIGHT SOURCE DEVICE

TECHNICAL FIELD

The present invention relates to a light source device and a display unit equipped with the light source device.

BACKGROUND ART

An exemplary light source device is a backlight device of a liquid crystal display unit. Such a light source device emits light from a main surface of a light guide plate on which light from a light source is incident. The light source may be a cold cathode fluorescent lamp (CCFL) which is a linear light source and a light emitting device (LED) which is a point light source.

With the above light source device, however, when, for example, plural linear light sources are arranged to provide a large-sized light source device or plural point light sources are arranged to provide even a small-sized light source device, a degree of non-uniformity in brightness tends to increase in a vicinity of a light incident portion of the light guide plate in which light from the plural light sources is introduced because of the existence of non-light emitting portions between the light sources. Under these circumstances, techniques of controlling an increase in the degree of non-uniformity in brightness have been developed and disclosed in, for example, PTLs 1 and 2.

CITATION LIST

Patent Literatures
PTL 1: Japanese Unexamined Patent Application Publication No. 9-259623
PTL 2: Japanese Unexamined Patent Application Publication No. 2001-110224

SUMMARY OF INVENTION

Technical Problem

In an LED light source back light module disclosed in PTL 1, since it is necessary to provide an area in which a recessed portion for introduction of light and a reflective surface on a side of the light guide plate on which the light sources are mounted, that area cannot be used as a display area. Similarly, in a surface emitting device disclosed in PTL 2, since it is necessary to provide an area for the formation of shaped parts or other parts integrated with the light guide plate, the area cannot be used as a display area. Accordingly, it is difficult to provide a compact light source device with the techniques disclosed in PTLs 1 and 2 because of the large dead space.

The present invention has been devised in view of the foregoing circumstances and an object thereof is to provide a compact light source device with a reduced degree of non-uniformity in brightness in light emitted by plural light sources, and a display unit equipped with the light source device.

Solution to Problem

A light source device according to the present invention includes; plural light sources disposed in a line and spaced apart from each other; a light guide which includes a first main surface, a second main surface and a surface disposed to face the light sources, the light guide causing light from the light sources to emit through the first main surface; and plural light diffusers disposed on the second main surface of the light guide, the plural light diffusers diffusing light incident on the light guide. The plural light sources include a first light source group consisting of plural first light sources and a second light source group consisting of plural second light sources. Each of the plural second light sources is disposed between adjacent first light sources of the first light source group and emits light different from light emitted by the first light sources. The plural light diffusers include first light diffusers and second light diffusers. The first light diffusers are located near the first light sources and in front of the first light sources in a light emitting direction. The second light diffusers are located near the second light sources and in front of the second light sources in a light emitting direction. The first light diffusers include a first light absorbing material which absorbs visible light emitted by the first light sources more easily than visible light emitted by the second light sources. The second light diffusers include a second light absorbing material which absorbs visible light emitted by the second light sources more easily than visible light emitted by the first light sources.

Advantageous Effects of Invention

According to the present invention, a compact light source device with a reduced degree of non-uniformity in brightness can be provided.

According to the present invention, a compact display unit with improved display quality can be provided.

DESCRIPTION OF EMBODIMENTS

Figure 1:
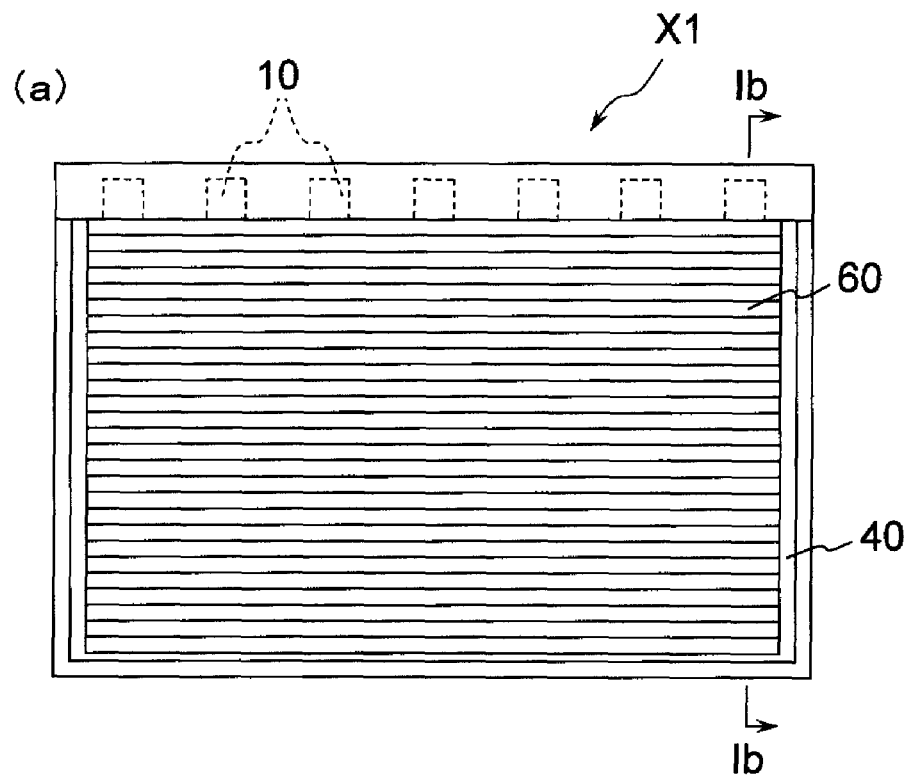
FIG. 1(a) is a plan view and FIG. 1(b) is a sectional view taken along line Ib-Ib in FIG. 1(a), each schematically illustrating a light source device according to a first embodiment of the present invention.
Figure 1:
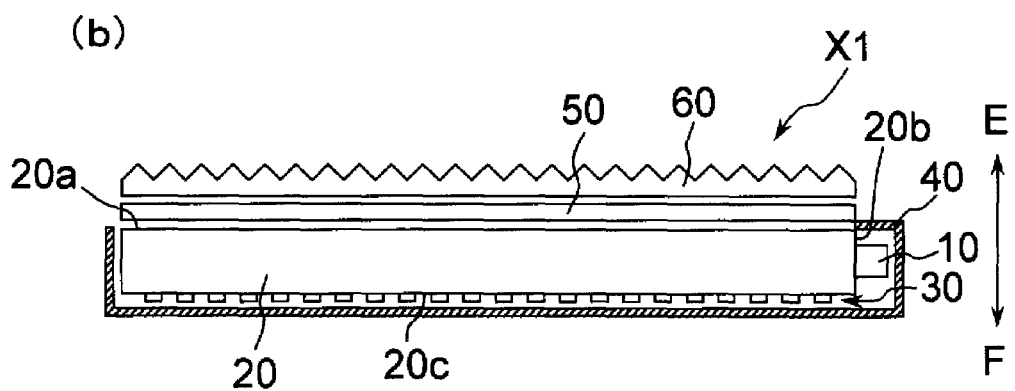

FIGS. 1(a) and 1(b) schematically illustrate a light source device X1 according to a first embodiment of the present invention.

The light source device X1 includes plural light sources 10, a light guide 20, plural light diffusers 30, a reflector 40, a diffuser plate 50 and a prism 60.

The light sources 10, which emit light toward the light guide 20, are arranged in a line and spaced apart from each other as illustrated in FIG. 1. The light sources 10 may be LEDs, cathode fluorescent lamps (CFL), halogen lamps, xenon lamps and electro-luminescence (EL) light sources. Among these, LEDs are preferably selected to provide low power consumption and low noise products.

The plural light sources 10 include a first light source group 10A consisting of plural first light sources 10a and a second light source group 10B consisting of plural second light sources 10b. The second light sources 10b emit light different from that emitted by the first light sources 10a. The first light sources 10a are arranged in a line and spaced apart from each other and each of the plural second light sources 10b is disposed between adjacent first light sources 10a.

Figure 2:
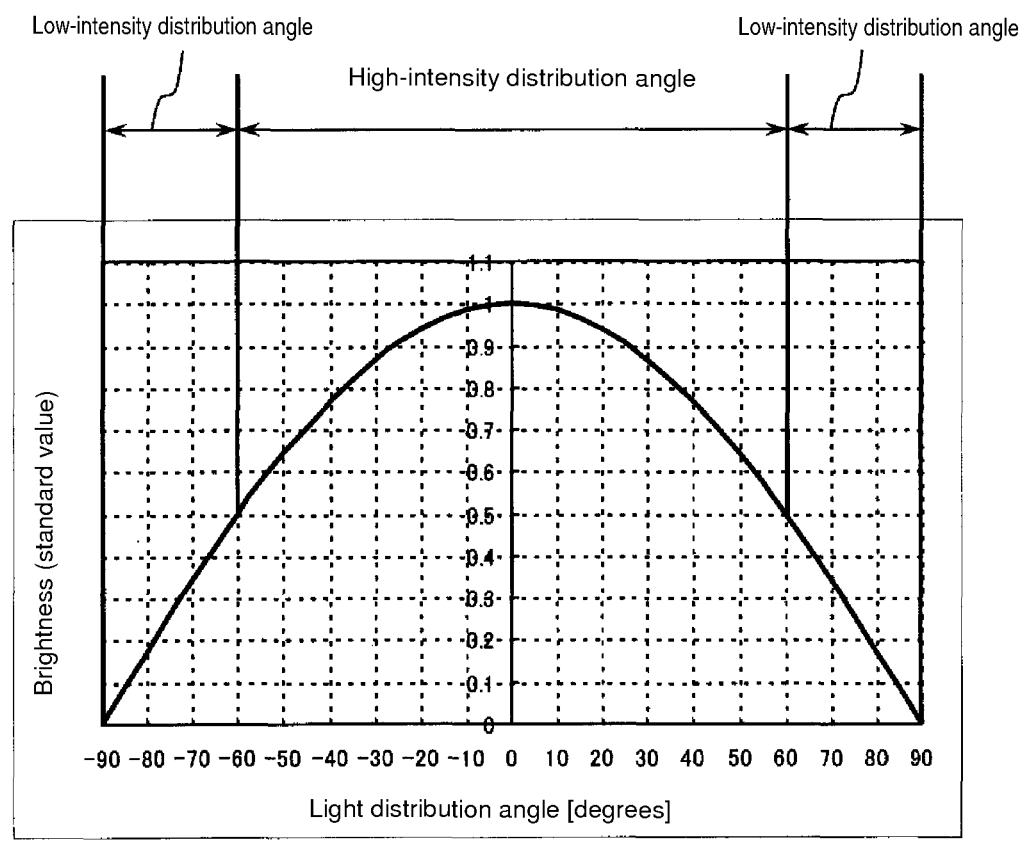
FIG. 2 is a graph illustrating an exemplary relationship between a light distribution angle of a light source and brightness.

In the light source device X1, angles at which brightness of the light emitted by the light sources 10a of the first light source group 10A is at or higher than a reference value are defined as first high-intensity distribution angles, and angles at which the brightness is at or lower than the reference value are defined as first low-intensity distribution angles. In the light source device X1, angles at which brightness of the light emitted by the light sources 10b of the second light source group 10B is at or higher than a reference value are defined as second high-intensity distribution angles, and angles at which the brightness is at or lower than the reference value are defined as second low-intensity distribution angles. The reference value may be selected desirably depending on required performance and, preferably, may be determined such that a degree of uniformity in brightness on a light emission surface 20a which emits light toward a target to be irradiated might be increased. For example, if the brightness of light incident from the light sources 10 in a direction perpendicular to a light incident surface 20b of the light guide 20 on which the light from the light source 10 is incident is defined as 1 (i.e., standardized), the reference value is preferably selected to be not smaller than 0.4 but not larger than 0.6. FIG. 2 is a graph illustrating an exemplary relationship between a light distribution angle of a light source and brightness. According to this graph, if the reference value (i.e., a standard value) is 0.5, angles in a range of −60 degrees to 60 degrees are the high-intensity distribution angles and angles in a range of −90 degrees to −60 degrees and 60 degrees to 90 degrees are low-intensity distribution angles.

The light guide 20 guides the light emitted by the plural light sources 10 to a target to be irradiated. The light guide 20 is formed in, for example, a rectangular parallelepiped shape including the light emission surface 20a as a first main surface, a lower surface 20c as a second main surface and the light incident surface 20b as a surface facing the light sources. The light emission surface 20a is an area through which light is emitted toward a target to be irradiated, such as a display panel. The lower surface 20c is disposed opposite to the light incident surface 20c. The light incident surface 20b is an area on which the light from the plural light sources 10 is incident. The light incident surface 20b is disposed to face the plural light sources 10. The light guide 20 may be formed of a translucent material, such as acrylic resin and polycarbonate resin. The "translucent material" herein has transmittance to visible light.

In the light source device X1, the light guide 20 includes first high-intensity distribution areas, first low-intensity distribution areas, second high-intensity distribution areas and second low-intensity distribution areas. The first high-intensity distribution areas are defined as areas on which the light emitted by the first light sources 10a of the first light source group 10A at the first high-intensity distribution angles is incident. The first low-intensity distribution areas are defined as areas other than the first high-intensity distribution areas and are areas on which the light emitted at the first low-intensity distribution angles is incident. In the light guide 20, the second high-intensity distribution areas are defined as areas on which the light emitted by the second light sources 10b of the second light source group 10B at the second high-intensity distribution angles is incident. The second low-intensity distribution areas are defined as areas other than the second high-intensity distribution areas and are areas on which the light emitted at the second low-intensity distribution angles is incident.

Figure 3:
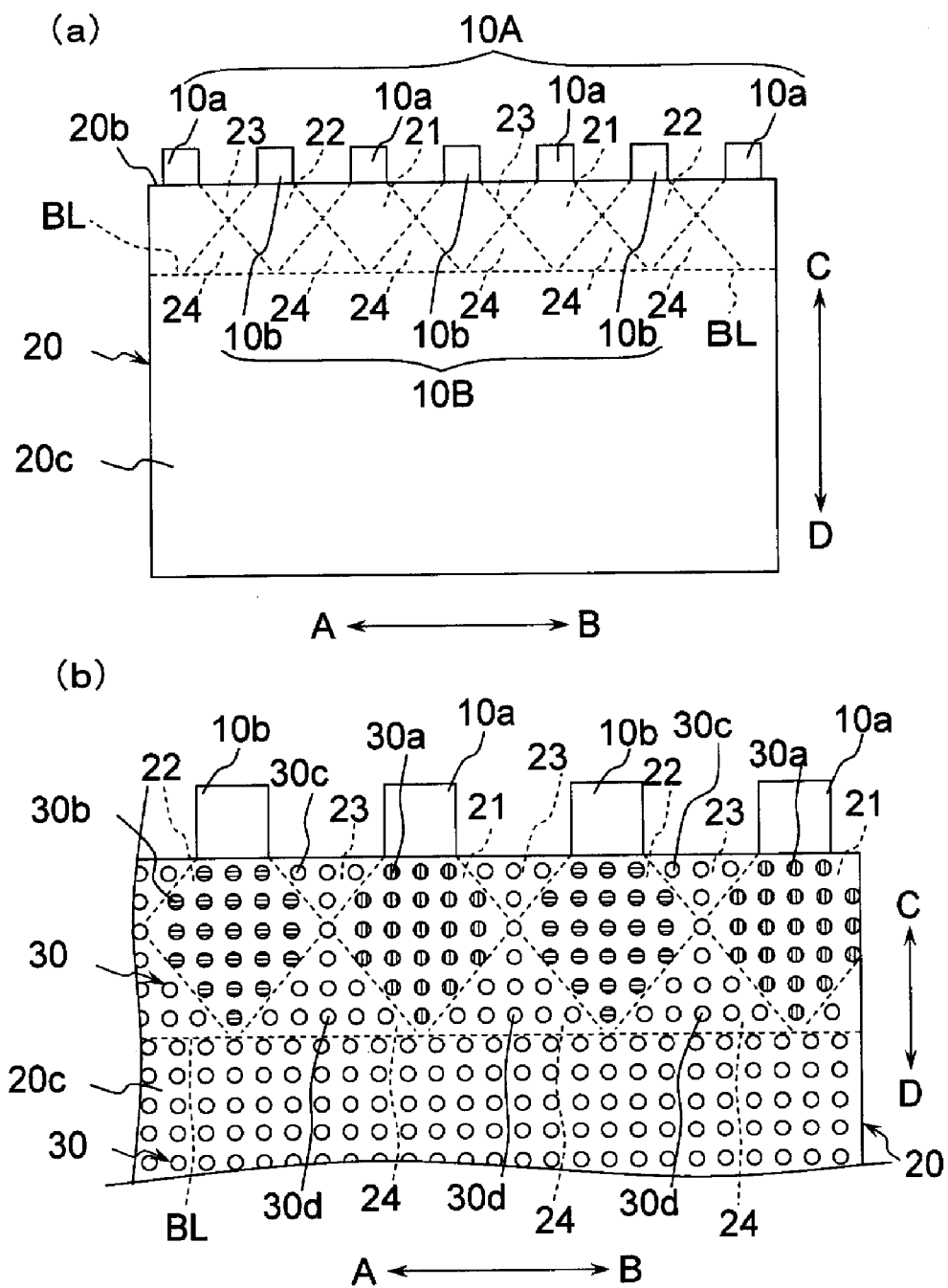
FIG. 3(a) is a plan view and FIG. 3(b) is an enlarged plan view of a main part, each schematically illustrating plural light sources and a light guide illustrated in FIGS. 1(a) and 1(b).

The light guide 20 includes first sections 21, second sections 22, third sections 23 and fourth sections 24. In FIGS. 3(a) and 3(b), boundaries of the sections 21, 22, 23 and 24 are indicated by dashed lines. The first sections 21 are located in the first high-intensity distribution areas and also in the second low-intensity distribution areas, and the first light sources 10a are disposed to face the first sections 21. The second sections 22 are located in the first low-intensity distribution areas and also in the second high-intensity distribution areas, and the second light sources 10b are disposed to face the second sections 22. The third sections 23 are located in the first low-intensity distribution areas and also in the second low-intensity distribution areas, and no light sources 10 are disposed to face the third sections 23. The fourth sections 24 are located in the first high-intensity distribution areas and also in the second high-intensity distribution areas, and at a side of the light sources 10a and 10b from a base line BL which connects intersections of the boundary lines of the first high-intensity distribution areas and the first low-intensity distribution areas.

FIGS. 3(a) and 3(b) are plan views which illustrate the plural light sources 10, the light guide 20 and the plural light diffusers 30.

The plural light diffusers 30 diffuse light incident thereon via the light guide 20, and are located on the lower surface 20c of the light guide 20. The plural light diffusers 30 include plural first light diffusers 30a, plural second light diffusers 30b, plural third light diffusers 30c and plural fourth light diffusers 30d.

The plural first light diffusers 30a are located in areas corresponding to the first sections 21 and include a first light absorbing material. The first light absorbing material has a function to absorb at least a part of visible light from the light sources 10. The first light absorbing material absorbs the visible light of the first light sources 10a more easily than that of the second light sources 10b. The first light absorbing material includes, for example, a pigment of a color similar to a complementary color of the light emitted by the first light sources 10a.

The plural second light diffusers 30b are located in areas corresponding to the second sections 22 and include a second light absorbing material. The second light absorbing material has a function to absorb at least a part of visible light from the light sources 10. The second light absorbing material absorbs the visible light of the second light sources 10b more easily than that of the first light sources 10a. The second light absorbing material includes, for example, a pigment of a color similar to a complementary color of the light emitted by the second light sources 10b. Here, an absorption rate of the visible light is determined in, for example, the following manner: a light absorbing material is irradiated with light from a light source; a light emission spectrum of transmitted light and a light emission spectrum of emitted light are measured and represented by a graph of a relationship between light intensity and a wavelength standardized by the maximum intensity; and the absorption rate is determined from an area difference in a visible light region of each spectrum.

The third light diffusers 30c are located in areas corresponding to the third sections 23 and the fourth light diffusers 30d are located in areas corresponding to the fourth sections 24. The third light diffusers 30c and the fourth light diffusers 30d have controlled absorption of the visible light emitted by the first light sources 10a and the visible light emitted by the second light sources 10b and include, for example, a white pigment. In the present embodiment, abundance ratios of the third light diffusers 30c and the fourth light diffusers 30d are substantially the same as abundance ratios of the first light diffusers 30a and the first light diffusers 30b. Here, the abundance ratios of the light diffusers 30a, 30b, 30c and 30d are obtained by dividing the total of plan view areas of the light diffusers 30a, 30b, 30c and 30d located in the sections corresponding to the areas 21, 22, 23 and 24 by the total of plan view areas of the sections 21, 22, 23 and 24. The term "substantially the same" means that variations within tolerance or manufacturing errors (for example, not greater than ±2%) are included.

In the present embodiment, the light diffusers 30 are plural point structures arranged in predetermined patterns. The light diffusers 30 may be formed of materials similar to those of the light guide 20. The light diffusers 30 are formed by, for example, applying the above-described material by known screen printing, ink jet printing or other method or providing grooves of predetermined shape (i.e., projections and depressions) on the lower surface 20c itself of the light guide 20 by molding or other method.

The reflector 40 reflects light emitted from surfaces other than the light emission surface 20a of the light guide 20 to be directed to the light guide 20. In the present embodiment, the reflector 40 is disposed to face the lower surface 20c of the light guide 20. The reflector 40 also reflects light not incident on the light guide 20 among the light emitted by the plural light sources 10 to be directed to the light guide 20. A part of the reflector 40 covers a part of the plural light sources 10. The reflector 40 may be formed of, for example, metals, such as silver, aluminum and alloys thereof, white foam fabricated by stretching a polyethylene terephthalate (PET)-based material, and a sheet consisting of a PET-based material-containing base on which a metal, such as silver, is deposited.

The diffuser plate 50 increases a degree of uniformity in brightness in the light emitted by the light emission surface 20a of the light guide 20 toward a target to be irradiated. The diffuser plate 50 is disposed to face the light emission surface 20a of the light guide 20. The diffuser plate 50 may be formed of, for example, a sheet consisting of a base which includes a resin material, such as PET, on which silica bead-containing resin is cured and a sheet in which silica beads are mixed in a resin material, such as polycarbonate (PC).

The prism 60 refracts incident light. The light incident on the prism 60 is refracted and emitted in a direction substantially perpendicular to the light emission surface 20a of the light guide 20. The prism 60 may be fabricated by, for example, stacking a prism structure formed of an acrylic material on a base which includes a resin material, such as PET, or forming a prism structure in the base itself which includes a resin material, such as PC.

In the light source device X1 according to the present embodiment, the first light diffusers 30a corresponding to the first sections 21 include the first light absorbing material, and the second light diffusers 30b corresponding to the second sections 22 include the second light absorbing material. That is, in the light source device X1, at least a part of the visible light from the first light sources 10a is absorbed in the first sections 21 in which brightness tends to increase when the light sources 10a emit light because the first sections 21 are located near the light sources 10a of the first light source group 10A among other places in the first high-intensity distribution areas. Similarly, in the light source device X1, at least a part of the visible light emitted by the second light sources 10b is absorbed in the second sections 22 in which brightness tends to increase when the light sources 10b emit light because the second sections 22 are located near the light sources 10b of the second light source group 10B among other places in the second high-intensity distribution areas. Thus, in the light source device X1, brightness can be reduced in sections in which brightness tends to increase relatively as in the first sections 21 when the light sources 10a of the first light source group 10A emit light or the second sections 22 when the light sources 10b of the second light source group 10B emit light. Accordingly, in the light source device X1, a degree of non-uniformity in brightness resulting from relatively increased brightness in the first sections 21 and the second sections 22 can be reduced.

In the light source device X1, the first sections 21, the second sections 22 and the third sections 23 can be used as display areas. Thus, creation of unnecessary dead space can be avoided when the light from the plural light sources 10 is incident on the light guide 20 and, therefore, a compact light source device X1 can be provided.

In the light source device X1, if the first light absorbing material includes a pigment of a color similar to a complementary color of the light emitted by the first light sources 10a, light can be reduced more efficiently in the first sections 21 by the first light absorbing material. If the second light absorbing material includes a pigment of a color similar to a complementary color of the second light sources 10b, light can be reduced more efficiently in the second sections 22 by the second light absorbing material. In the light source device X1, if the third light diffusers 30c corresponding to the third sections 23 include a white pigment, a decrease in brightness in the third sections 23 in which brightness tends to decrease relatively because of their being located in the first low-intensity distribution areas and in the second low-intensity distribution areas can be controlled. Accordingly, in the light source device X1, a degree of non-uniformity in brightness resulting from relatively decreased brightness in the third sections 23 can be reduced.

Figure 4:
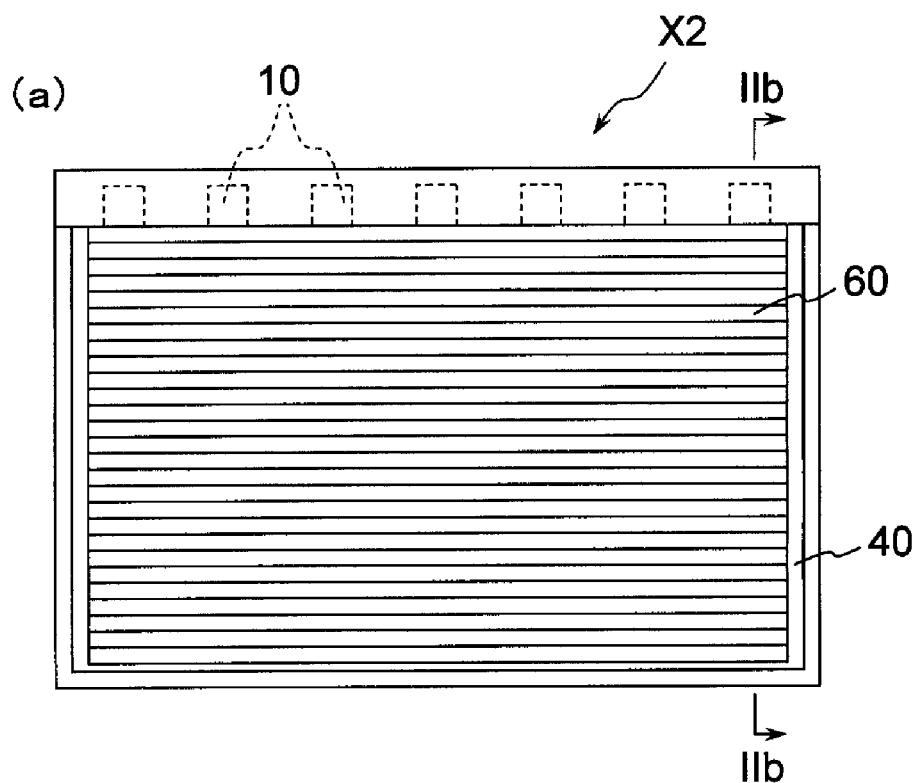
FIG. 4(a) is a plan view and FIG. 4(b) is a sectional view taken along line IIb-IIb in FIG. 4(a), each schematically illustrating a light source device according to a second embodiment of the present invention.
Figure 4:
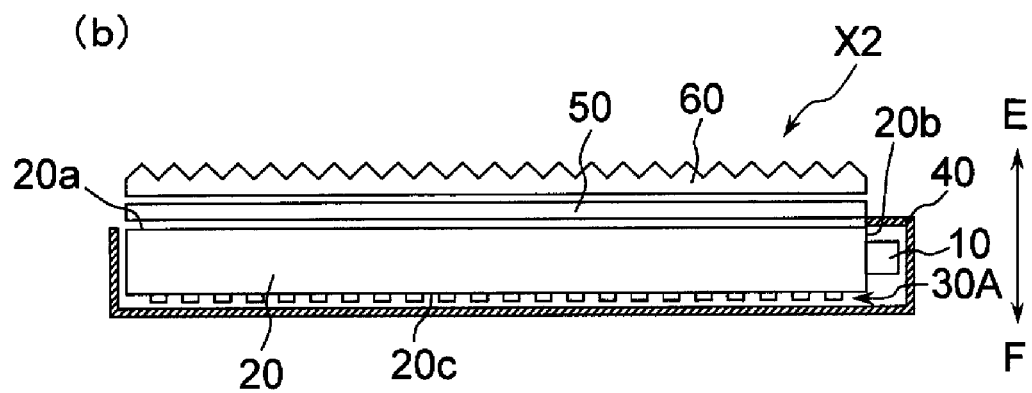
Figure 5:
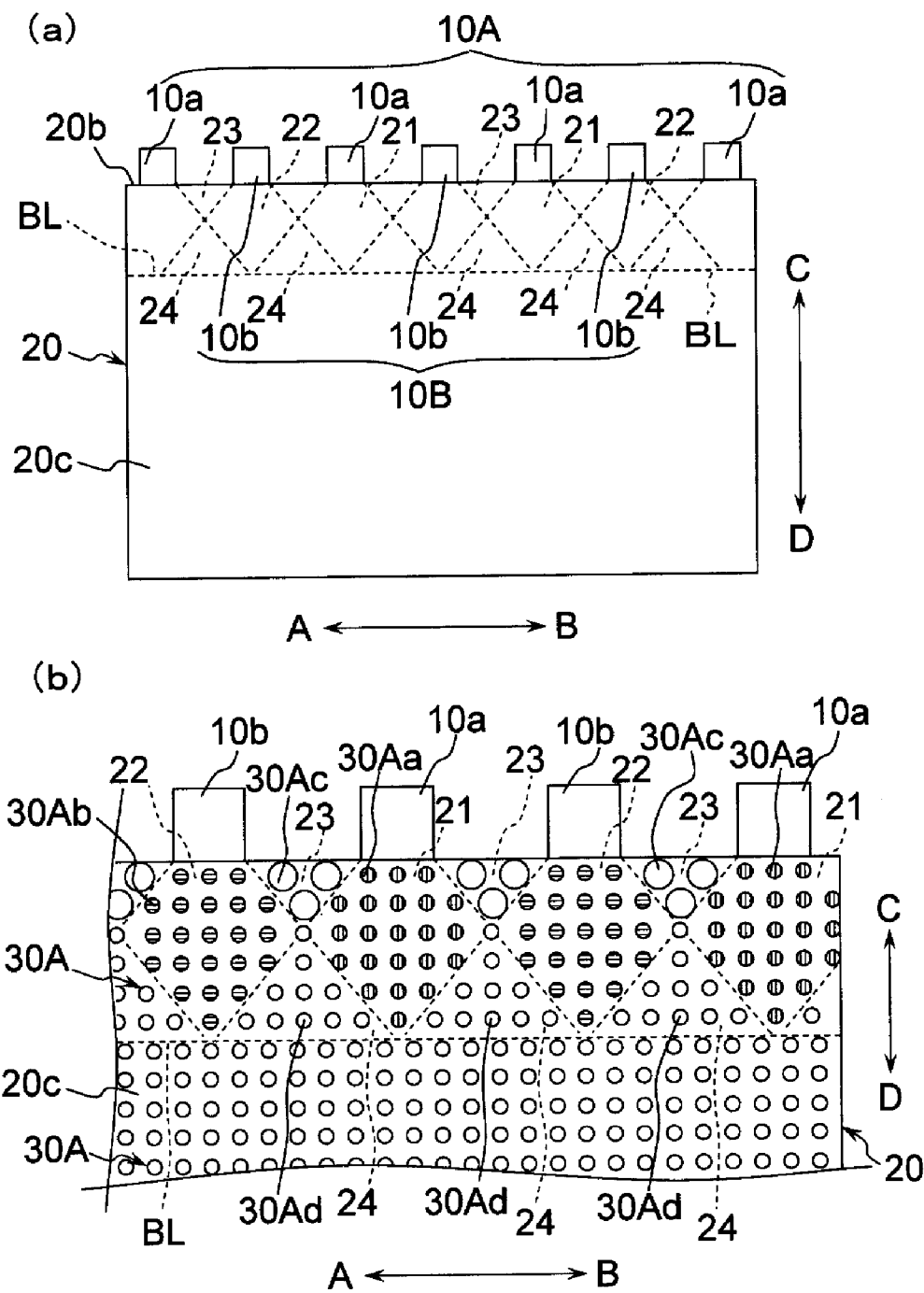
FIG. 5(a) is a plan view and FIG. 5(b) is an enlarged plan view of a main part, each schematically illustrating plural light sources and a light guide illustrated in FIGS. 4(a) and 4(b).

FIGS. 4(a) and 4(b) schematically illustrate a light source device X2 according to a second embodiment of the present invention. FIGS. 5(a) and 5(b) are plan views illustrating plural light sources 10, a light guide 20 and plural light diffusers 30A.

The light source device X2 differs from the light source device X1 in that the light diffusers 30A are employed in place of the light diffusers 30. Components of the light source device X2 that are common to those of the above-described light source device X1 will not be described.

The plural light diffusers 30A differ from the above-described light diffusers 30 in that an abundance ratio of the third light diffusers 30Ac is set higher than abundance ratios of the first light diffusers 30Aa and the second light diffusers 30Ab, and an abundance ratio of the fourth light diffusers 30Ad is set lower than an abundance ratio of the third light diffusers 30Ac.

The light source device X2 according to the present embodiment provides the same advantageous effects as those provided by the light source device X1. In addition, in the light source device X2 according to the present embodiment, since the abundance ratio of the third light diffusers 30Ac corresponding to the third sections 23 is higher than the abundance ratio of the first light diffusers 30Aa corresponding to the first sections 21 and is higher than the abundance ratio of the second light diffusers 30Ab corresponding to the second sections 22, brightness in the third sections 23 in which brightness tends to decrease can be further increased. Accordingly, in the light source device X2, a degree of non-uniformity in brightness resulting from relatively decreased brightness in the third sections 23 can be further reduced.

In the light source device X2, the abundance ratio of the fourth light diffusers 30Ad corresponding to the fourth sections 24 is lower than the abundance ratio of the third light diffusers 30Ac corresponding to the third sections 23. Accordingly, in the light source device X2, a difference between brightness in the fourth sections in which brightness tends to increase because of their being located in the first high-intensity distribution areas and also in the second high-intensity distribution areas and brightness in the third sections 23 can be reduced. Accordingly, in the light source device X2, a degree of non-uniformity in brightness resulting from the difference between brightness in the third sections 23 and brightness in the fourth sections 24 can be reduced.

Figure 6:
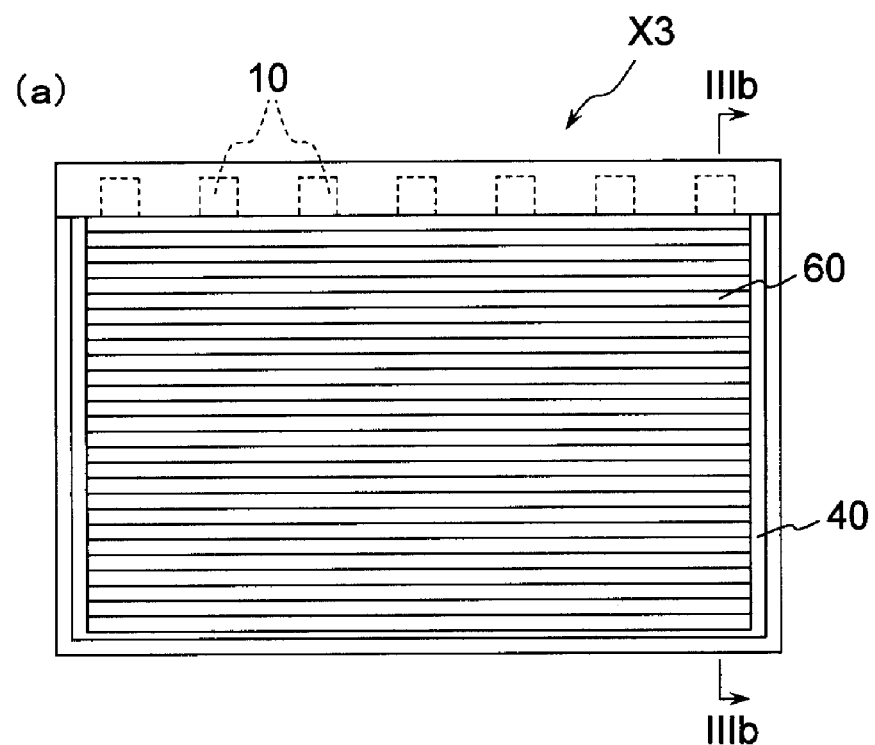
FIG. 6(a) is a plan view and FIG. 6(b) is a sectional view taken along line IIIb-IIIb in FIG. 6(a), each schematically illustrating a light source device according to a third embodiment of the present invention.
Figure 6:
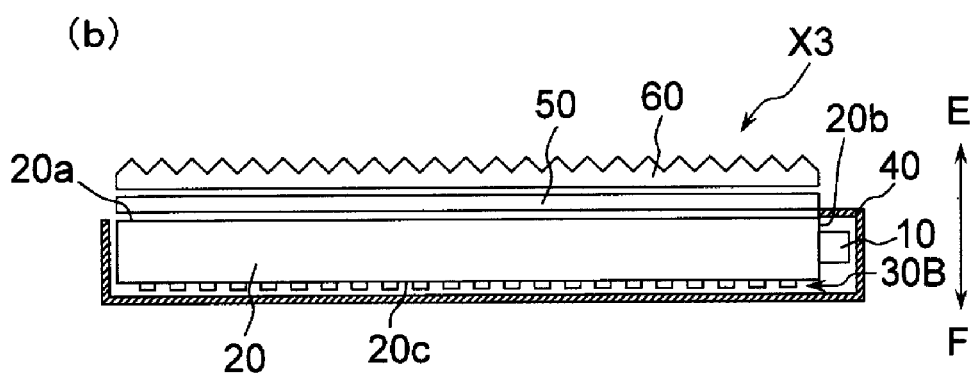
Figure 7:
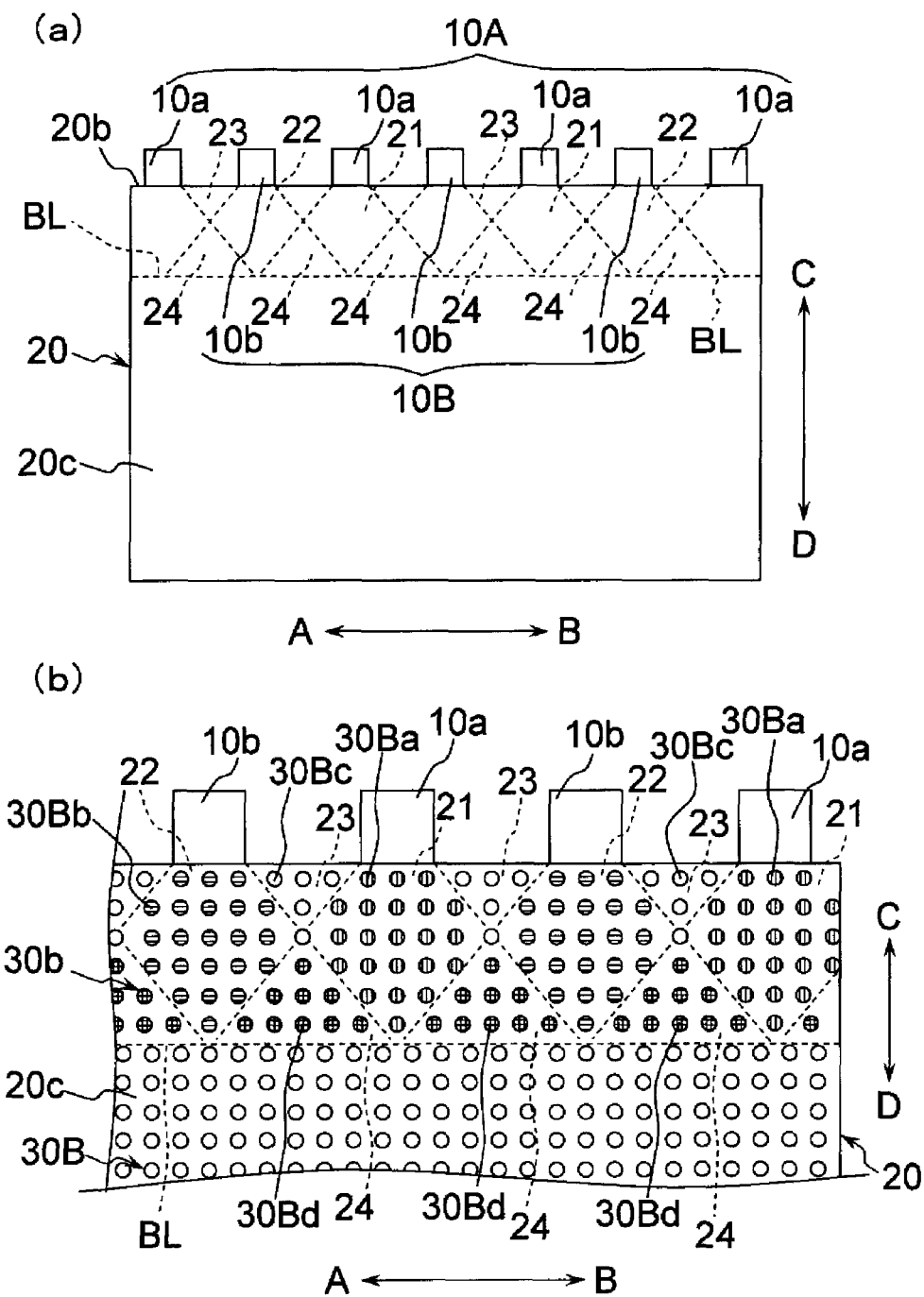
FIG. 7(a) is a plan view and FIG. 7(b) is an enlarged plan view of a main part, each schematically illustrating plural light sources and a light guide illustrated in FIGS. 6(a) and 6(b).

FIGS. 6(a) and 6(b) schematically illustrate a light source device X3 according to a third embodiment of the present invention. FIGS. 7(a) and 7(b) is a plan view illustrating plural light sources 10, a light guide 20 and plural light diffusers 30B.

The light source device X3 differs from the light source device X2 in that the light diffusers 30B are employed in place of the light diffusers 30. Components of the light source device X3 that are common to those of the above-described light source device X1 will not be described.

The plural light diffusers 30B differ from the above-described light diffusers 30 in that second light diffusers 30Bd includes both a first light absorbing material and a second light absorbing material.

The light source device X3 according to the present embodiment provides the same advantageous effects as those provided by the light source device X1. In addition, in the light source device X3 according to the present embodiment, since the fourth light diffusers 30Bd corresponding to the fourth sections 24 include both the first light absorbing material and the second light absorbing material, a difference between brightness in the fourth sections 24 in which brightness tends to increase because of their being located in the first high-intensity distribution areas and also in the second high-intensity distribution areas and brightness in the sections 21, 22 and 23 can be reduced. Accordingly, in the light source device X3, a degree of non-uniformity in brightness resulting from the difference between brightness in the sections 21, 22 and 23 and brightness in the fourth sections 24 can be reduced.

Figure 8:
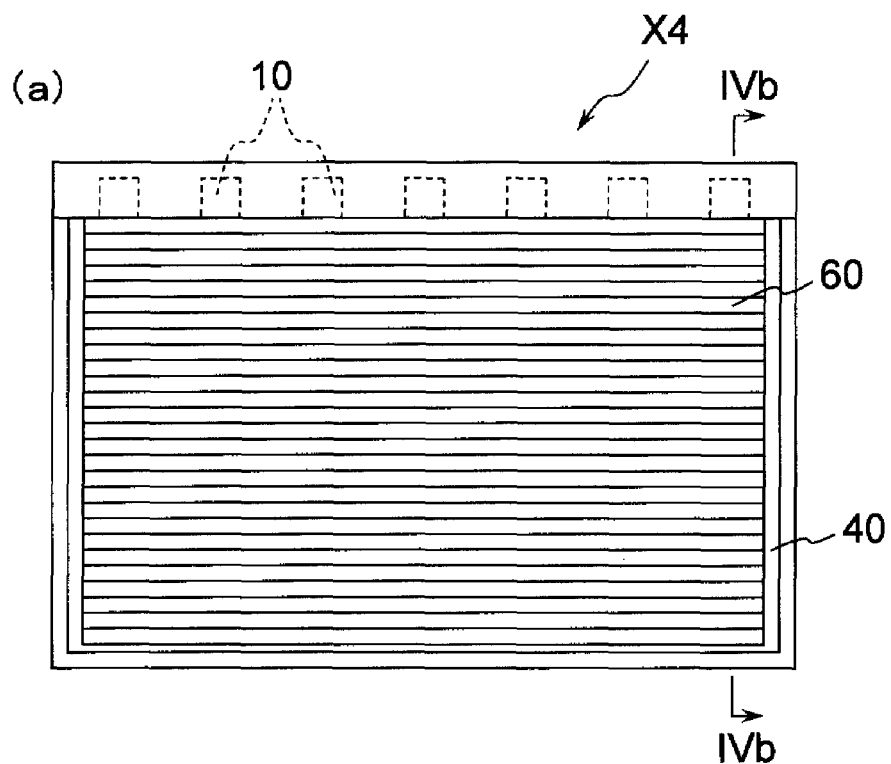
FIG. 8(a) is a plan view and FIG. 8(b) is a sectional view taken along line IVb-IVb in FIG. 8(a), each schematically illustrating a light source device according to a fourth embodiment of the present invention.
Figure 8:
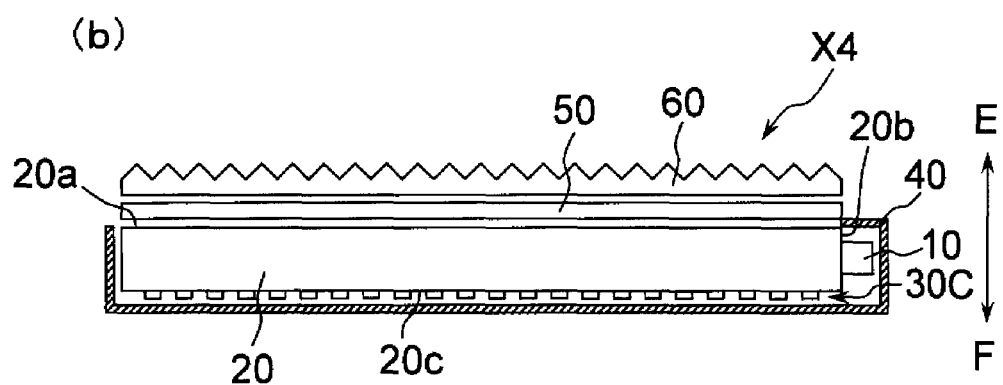
Figure 9:
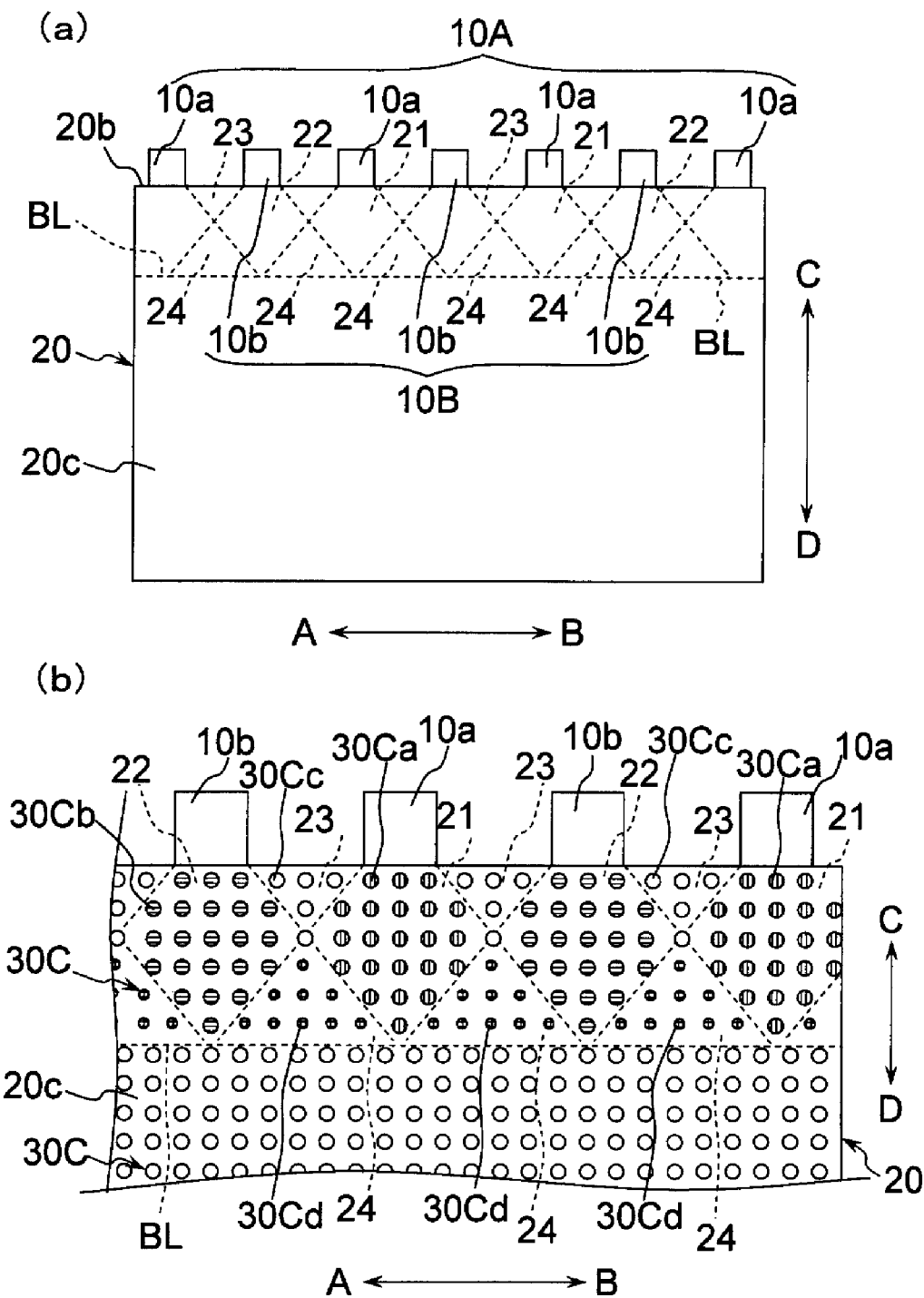
FIG. 9(a) is a plan view and FIG. 9(b) is an enlarged plan view of a main part, each schematically illustrating plural light sources and a light guide illustrated in FIGS. 8(a) and 8(b).

FIGS. 8(a) and 8(b) schematically illustrate a light source device X4 according to a fourth embodiment of the present invention. FIGS. 9(a) and 9(b) are plan views illustrating plural light sources 10, a light guide 20 and plural light diffusers 30C.

The light source device X4 differs from the light source device X3 in that the light diffusers 30C are employed in place of the light diffusers 30B. Components of the light source device X4 that are common to those of the above-described light source devices X1 and X3 will not be described.

The plural light diffusers 30C in the present embodiment differ from the above-described light diffusers 30B in that an abundance ratio of fourth light diffusers 30Cd is set lower than abundance ratios of first light diffusers 30Ca and second light diffusers 30Cb.

The light source device X4 according to the present embodiment provides the same advantageous effects as those provided by the light source device X3. In addition, in the light source device X4 according to the present embodiment, the abundance ratio of the fourth light diffusers 30Cd corresponding to the fourth sections 24 is lower than the abundance ratio of the first light diffusers 30Ca corresponding to the first sections 21 and is lower than the abundance ratio of the second light diffusers 30Cb corresponding to the second sections 22. Thus, even when brightness in the fourth sections 24 tends to be higher than brightness in the sections 21, 22 and 23 as in a case in which the light sources 10a of the first light source group 10A and the light sources 10b of the second light source group 10C are made to emit light simultaneously, a difference between brightness in the fourth sections 24 and brightness in the sections 21, 22 and 23 can be reduced. Accordingly, in the light source device X4, a degree of non-uniformity in brightness resulting from the difference between brightness in the sections 21, 22 and 23 and brightness in the fourth sections 24 can be reduced even in a case of simultaneous light emission as described above.

Figure 10:
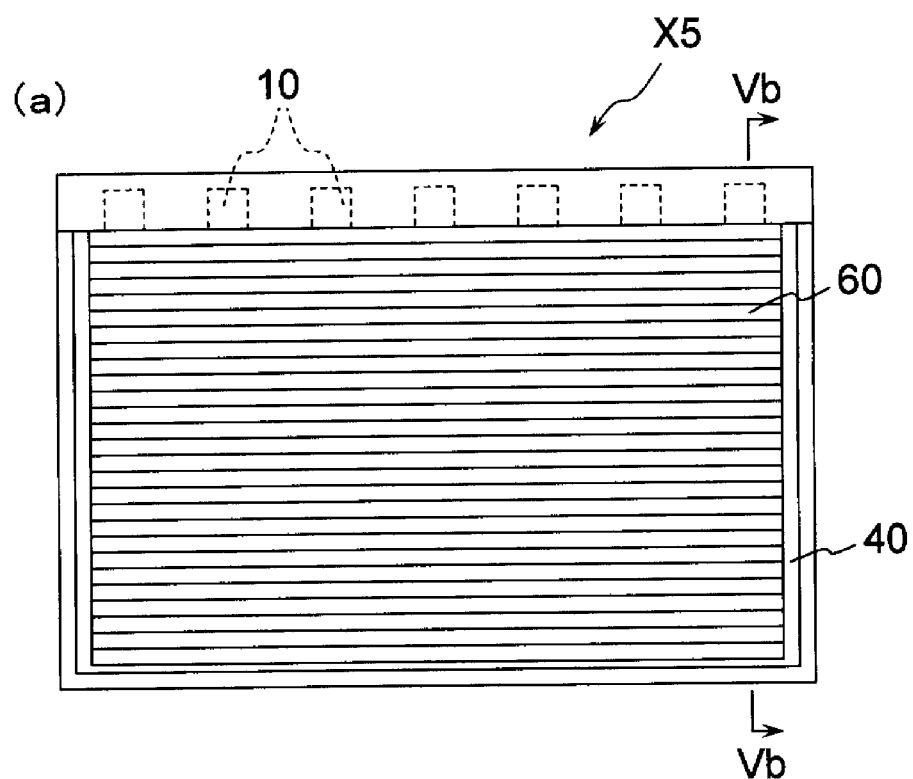
FIG. 10(a) is a plan view and FIG. 10(b) is a sectional view taken along line Vb-Vb in FIG. 10(a), each schematically illustrating a light source device according to a fifth embodiment of the present invention.
Figure 10:
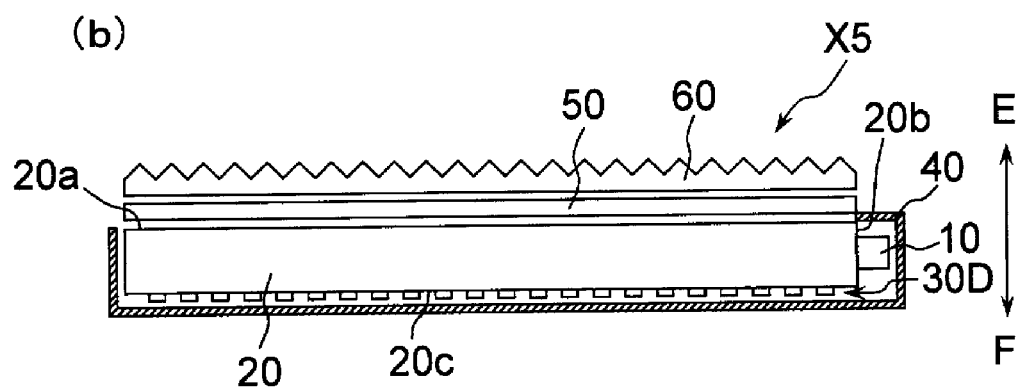
Figure 11:
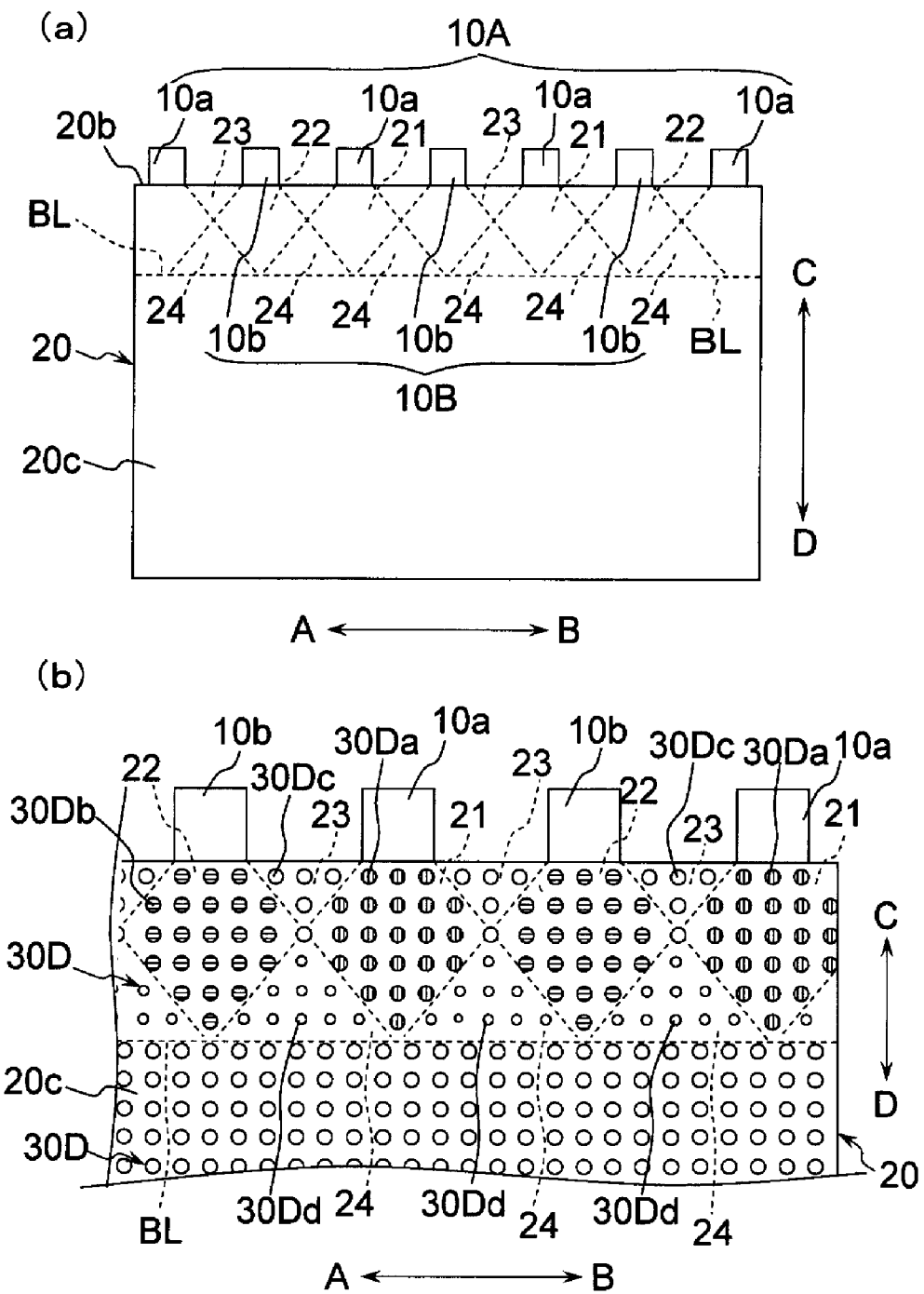
FIG. 11(a) is a plan view and FIG. 11(b) is an enlarged plan view of a main part, each schematically illustrating plural light sources and a light guide illustrated in FIGS. 10(a) and 10(b).

FIGS. 10(a) and 10(b) schematically illustrate a light source device X5 according to a fifth embodiment of the present invention. FIGS. 11(a) and 11(b) are plan views illustrating plural light sources 10, a light guide 20 and plural light diffusers 30D.

The light source device X5 differs from the light source device X1 in that the light diffusers 30D are employed in place of the light diffusers 30. Components of the light source device X5 that are common to those of the above-described light source device X1 will not be described.

The plural light diffusers 30D differ from the light source device X2 in that an abundance ratio of fourth light diffusers 30Dd is lower than an abundance ratio of first light diffusers 30Da and is lower than an abundance ratio of first light diffusers 30Db.

The light source device X5 according to the present embodiment provides the same advantageous effects as those provided by the light source device X1. In addition, in the light source device X5 according to the present embodiment, the abundance ratio of the fourth light diffusers 30Dd corresponding to the fourth sections 24 is lower than the abundance ratio of the first light diffusers 30Da corresponding to the first sections 21 and is lower than the abundance ratio of the second light diffusers 30Db corresponding to the second sections 22. Thus, in the light source device X5, even when brightness in the fourth sections 24 tends to be higher than brightness in the sections 21, 22 and 23 as in a case in which the light sources 10a of the first light source group 10A and the light sources 10b of the second light source group 10B are made to emit light simultaneously, a difference between brightness in the fourth sections 24 and brightness in the sections 21, 22 and 23 can be reduced. Accordingly, in the light source device X5, a degree of non-uniformity in brightness resulting from the difference between brightness in the sections 21, 22 and 23 and brightness in the fourth sections 24 can be reduced even in a case of simultaneous light emission as described above.

FIGS. 12(a) and 12(b) schematically illustrate a light source device X6 according to a sixth embodiment of the present invention. FIGS. 12(a) and 12(b) are plan views illustrating plural light sources 10, a light guide 20A and plural light diffusers 30E.

The light source device X6 differs from the light source device X1 in that the light guide plate 20A is employed in place of the light guide plate 20 and that the light diffusers 30E are employed in place of the light diffusers 30. The light sources 10 according to the present embodiment are constituted only by a first light source group 10A which includes plural first light sources 10a. Components of the light source device X6 that are common to those of the above-described light source device X1 will not be described.

In the present embodiment, the light sources 10 are constituted only by the first light source group 10A which includes the plural first light sources 10a. In the light source device X6, angles at which brightness of light emitted by the first light sources 10a is at or higher than a reference value are defined as high-intensity distribution angles, and angles at which the brightness is at or lower than the reference value are defined as low-intensity distribution angles.

Figure 13:
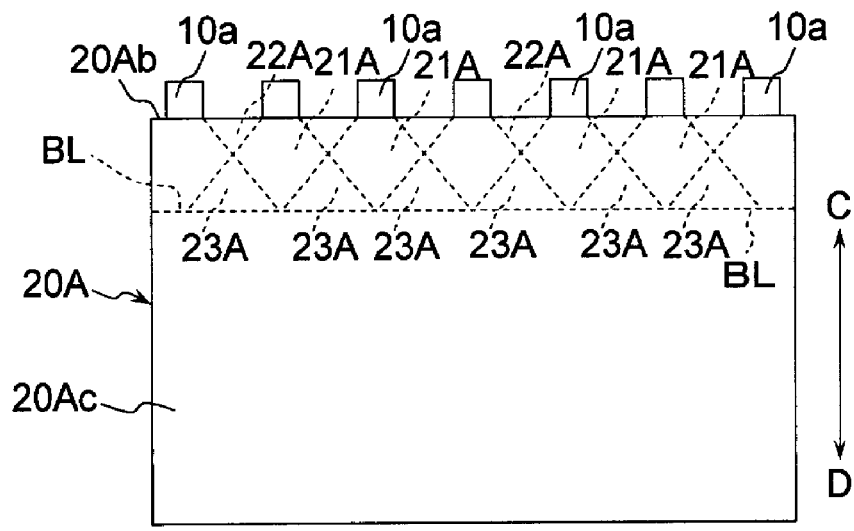
FIG. 13(a) is a plan view and FIG. 13(b) is an enlarged plan view of a main part, each schematically illustrating plural light sources and a light guide illustrated in FIGS. 12(a) and 12(b).
Figure 13:
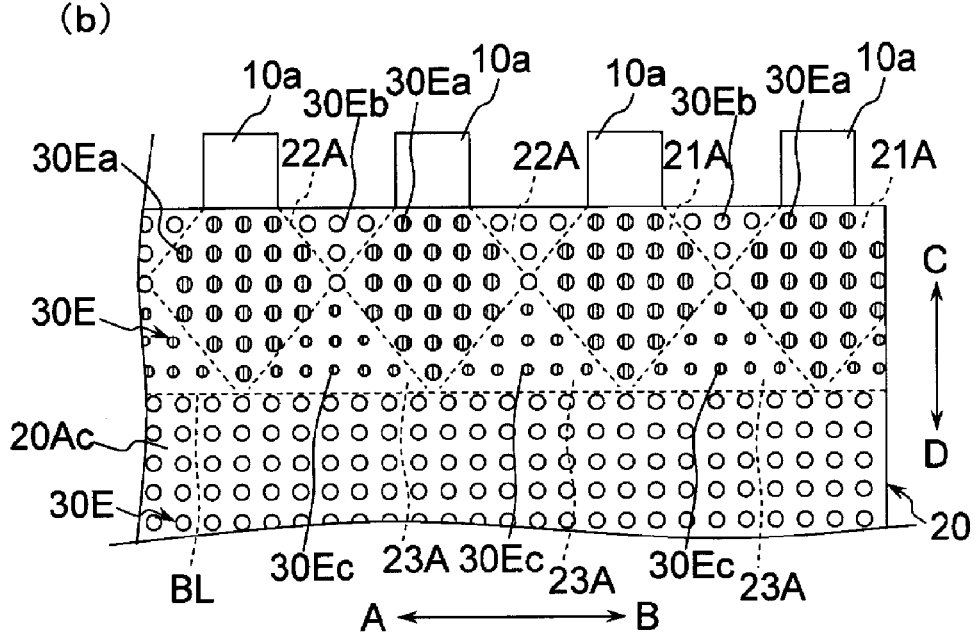
Figure 14:
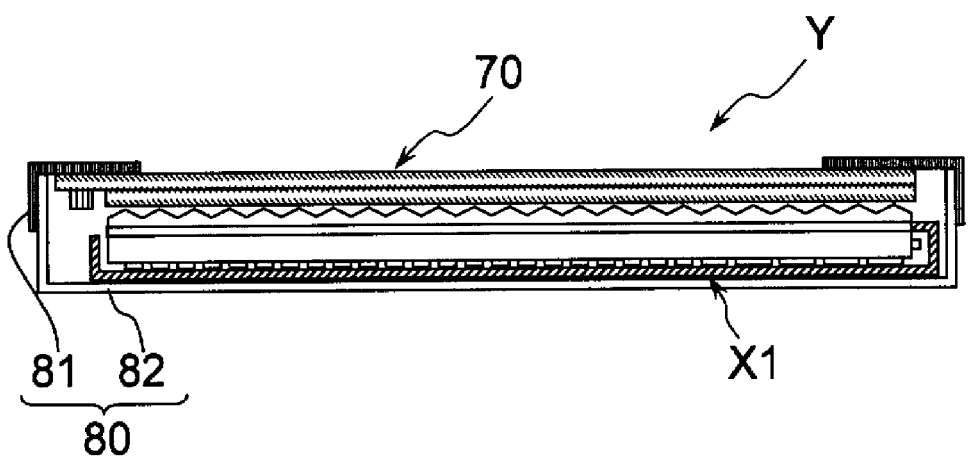
FIG. 14 is a sectional view which schematically illustrates a display unit equipped with the light source device illustrated in FIG. 1.

The light guide 20A includes first sections 21A, second sections 22A and third sections 23A. In FIGS. 13(a) and 13(b), boundaries of the sections 21A, 22A and 23A are indicated by dashed lines. The first sections 21A are located in high-intensity distribution areas of the first light sources 10a and also in low-intensity distribution areas of adjacent first light sources 10a. The first light sources 10a are disposed to face the first sections 21A. The second sections 22A are located in the low-intensity distribution areas and no first light sources 10a are disposed to face the second sections 22A. The third sections 23A are located in the high-intensity distribution areas of the first light sources 10a and also in the high-intensity distribution areas of adjacent first light sources 10a, and at a side of the first light sources 10a from a base line BL which connects intersections of the boundary lines of the high-intensity distribution areas and the low-intensity distribution areas.

The plural light diffusers 30E include plural first light diffusers 30Ea, plural second light diffusers 30Eb and plural third light diffusers 30Ec. The plural first light diffusers 30Ea are located in sections corresponding to the first sections 21A. The plural second light diffusers 30Eb are located in sections corresponding to the second sections 22A. The plural third light diffusers 30Ec are located in sections corresponding to the third sections 23A. The first light diffusers 30Ea include a light absorbing material. The light absorbing material has a function to absorb at least a part of visible light from the first light sources 10a and includes, for example, a pigment of a color similar to a complementary color of the light emitted by the first light sources 10a. The second light diffusers 30Eb include, for example, a white pigment which controls the absorption of the visible light from the first light sources 10a. In the present embodiment, the third light diffusers 30Ec include a light absorbing material, and an abundance ratio of the third light diffusers 30Ec is lower than abundance ratios of the first light diffusers 30Ea and the second light diffusers 30Eb.

In the light source device X6 according to the present embodiment, the first light diffusers 30Ea corresponding to the first sections 21A include the light absorbing material. That is, in the light source device X1, at least a part of the visible light from the first light sources 10a is absorbed in the first sections 21A in which brightness tends to increase when the light sources 10a emit light because the first sections 21A are located near the light sources 10a among other places in the high-intensity distribution areas. Thus, in the light source device X6, brightness can be reduced in sections in which brightness tends to increase as in the first sections 21A when the light sources 10 emit light. Accordingly, in the light source device X1, a degree of non-uniformity in brightness resulting from relatively increased brightness in the first sections 21A can be reduced.

In the light source device X6, the first sections 21A and the second sections 22A can be used as display areas. Thus, creation of unnecessary dead space can be avoided when the light emitted by the light sources 10a is incident on the light guide 20A and, therefore, a compact light source device X6 can be provided.

In the light source device X6, if the second light diffusers 30Eb corresponding to the second sections 22A include a white pigment, a decrease in brightness in the second sections 22A in which brightness tends to decrease relatively can be controlled. Accordingly, in the light source device X6, a degree of non-uniformity in brightness resulting from relatively decreased brightness in the second sections 22A can be reduced. If the abundance ratio of the second light diffusers 30Eb corresponding to the second sections 22A is set higher than the abundance ratio of the first light diffusers 30Ea corresponding to the first sections 21A, a degree of non-uniformity in brightness resulting from a difference between brightness in the first sections 21A and brightness in the second sections 22A can be reduced.

In the light source device X6, the third light diffusers 30Ac corresponding to the third sections 23A include the light absorbing material. Thus, even when brightness in the third sections 23A tends to be higher than brightness in the sections 21A and 22A, a difference between brightness in third sections 23A and brightness in the sections 21A and 22A can be reduced. Accordingly, in the light source device X6, a degree of non-uniformity in brightness resulting from the difference between brightness in the first sections 21A and the second sections 22A and brightness in the third sections 23A can be reduced.

In the light source device X6, the abundance ratio of the third light diffusers 30Ec corresponding to the third sections 23A is lower than the abundance ratio of the first light diffusers 30Ea corresponding to the first sections 21A and is lower than the abundance ratio of the second light diffusers 30Eb corresponding to the second sections 22A. Thus, even when brightness in the third sections 23A tends to be higher than brightness in the sections 21A and 22A, a difference between the third sections 23 and brightness in the sections 21A and 22A can be reduced. Accordingly, a degree of non-uniformity in brightness resulting from the difference between brightness in the sections 21A and 22A and brightness in the third sections 23A can be reduced.

Figure 12:
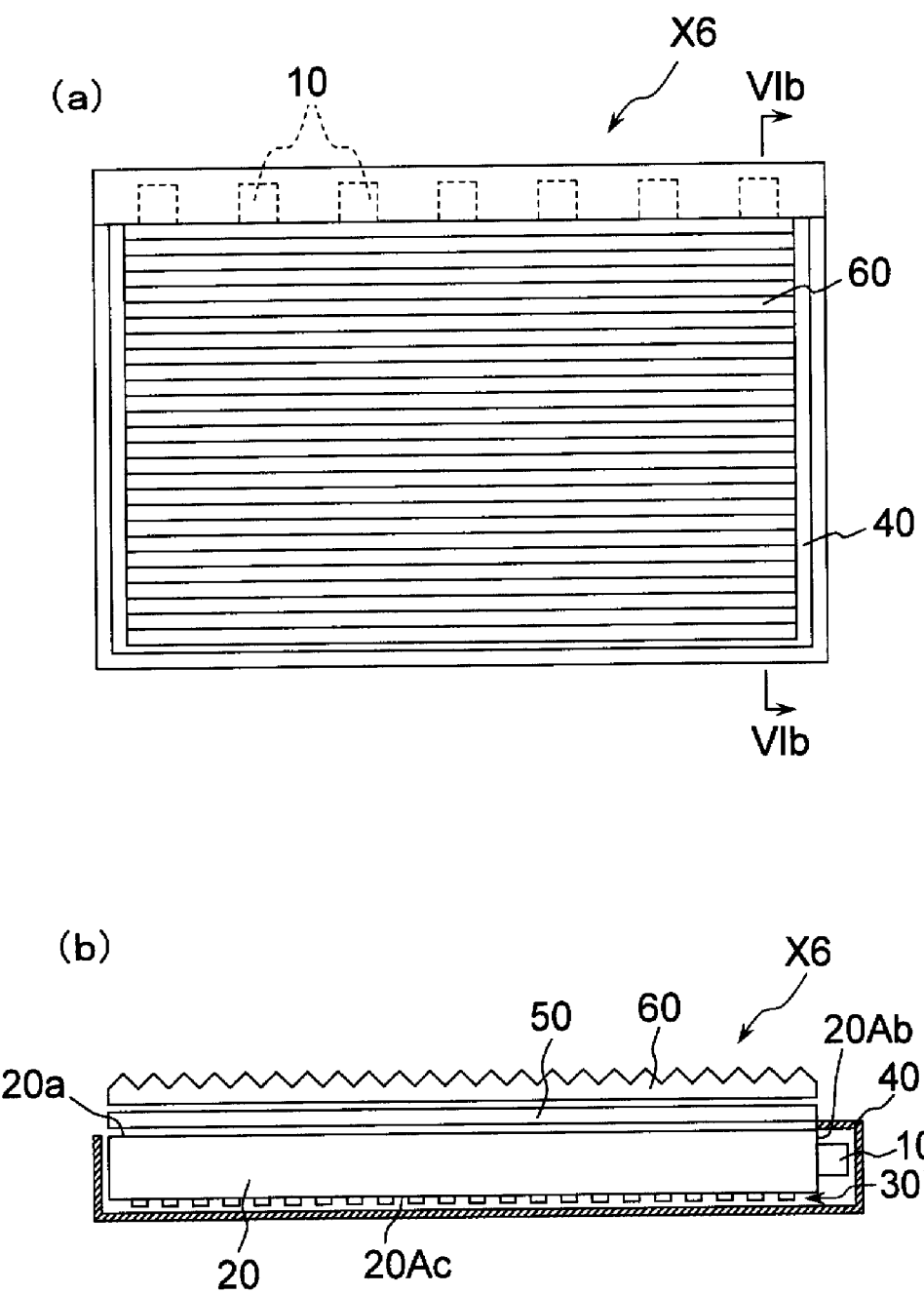
FIG. 12(a) is a plan view and FIG. 12(b) is a sectional view taken along line VIb-VIb in FIG. 12(a), each schematically illustrating a light source device according to a sixth embodiment of the present invention.

FIG. 12 is a sectional view schematically illustrating a display unit Y equipped with the light source device X1 according to the present invention. The display unit Y includes the light source device X1, a display panel 70 and a housing 80. Although the display unit Y will be described with reference to the light source device X1, the light source devices X2, X3, X4, X5 and X6 may also be employed similarly.

The display unit Y includes the light source device X1 and the display panel 70.

The display panel 70 is disposed to face the light emission surface 20a of the light guide 20 of the light source device X1 via the diffuser 50 and the prism 60.

Figure 15:
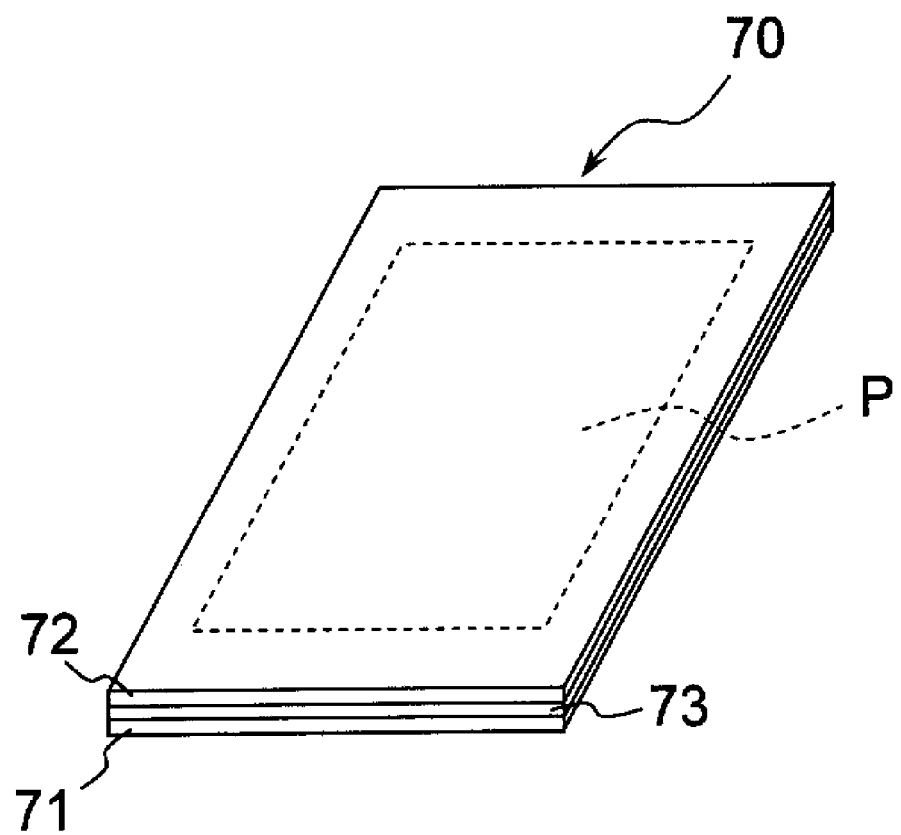
FIG. 15 is a perspective view which schematically illustrates a display panel in the display unit illustrated in FIG. 14.

The display panel 70 includes a first base 71, a second base 72 and a sealing member 73. As illustrated in FIG. 15, a display area P consisting of plural pixels for displaying images is formed by a first base 71, a second base 72 and a liquid crystal layer (not illustrated) which is disposed between the first base 71 and the second base 72 and is sealed with a sealing member 73.

The housing 80 accommodates the display panel 70 and the light source device X1, and includes an upper housing 81 and a lower housing 82. The housing 80 may be formed of, for example, resin, such as polycarbonate resin, and metal, such as stainless steel (SUS) or aluminum.

Since the display unit Y according to the present embodiment is equipped with the light source device X1, the same advantageous effects as those of the above-described light source device X1 can be provided. In particular, a compact display unit Y with improved display quality can be provided.

Although embodiments of the present invention have been described, the present invention is not limited to the same.

In the light source devices X1, X2, X3, X4 and X5, the first light diffusers 30, 30Aa, 30Ba, 30Ca and 30Da corresponding to the first sections 21 may further include a first light reflective material. The first light diffusers 30, 30Aa, 30Ba, 30Ca and 30Da may be, for example, plural point structures which include the first light absorbing material and the first light reflective material in predetermined amounts or, alternatively, may be a combination of point structures which only include the first light absorbing material and point structures which only include the first light reflective material. The first light reflective material has a function to reflect a part of the light emitted by the first light sources 10a and includes, for example, at least one of a pigment of a color similar to that of the light emitted by the first light sources 10a and a white pigment. With this, the difference in brightness in the first sections 21 and brightness in other sections 22, 23 and 24 can be reduced more appropriately. Note that it is preferred that the first light diffusers 30, 30Aa, 30Ba, 30Ca and 30Da include a component which reflects light emitted by the first light sources 10a in an amount greater than a component which reflects light emitted by the first light sources 10a.

In the light source devices X1, X2, X3, X4 and X5, the second light diffusers 30b, 30Ab, 30Bb, 30Cb and 30Db corresponding to the second sections 22 may further include a second light reflective material. The first light diffusers 30a, 30Ab, 30Bb, 30Cb and 30Db may be, for example, plural point structures which include the second light absorbing material and the second light reflective material in predetermined amounts or, alternatively, may be a combination of point structures which only include the second light absorbing material and point structures which only include the second light reflective material. The second light reflective material has a function to reflect the light emitted by the second light sources 10b and includes, for example, at least one of a pigment of a color similar to that of the light emitted by the second light sources 10b and a white pigment. With this, the difference in brightness in the second sections 22 and brightness in other sections 21, 23 and 24 can be reduced more appropriately. Note that it is preferred that the second light diffusers 30Ab, 30Bb, 30Cb, 30Db and 30Ea include a component which reflects light emitted by the second light sources 10b in an amount greater than a component which reflects light emitted by the second light sources 10b.

In the light source devices X1, X2, X3, X4, X5 and X6, the point structures are formed in a substantially circular cylindrical shape which is substantially circular in a plan view in order to improve manufacturability of the light diffusers 30, 30A, 30B, 30C, 30D and 30E. However, shapes of the point structures are not limited thereto. For example, the point structures may be formed in a substantially hemispheric shape which is substantially circular in a plan view, a substantially circular cylindrical shape which is substantially elliptical in a plan view, or a substantially polygonal column shape which is substantially polygonal shape in a plan view, which increases arrangement density. Here, the "polygonal shape" is a shape with (2n+1) or greater number of vertices where n is a natural number.

Although in the light source devices X1, X2, X3, X4, X5 and X6, the plural light sources 10 are constituted by a single light source group 10A or two light source groups 10A and 10B, three or more light source groups may also be employed.

Reference Signs List

X1, X2, X3, X4, X5, X6 light source device
Y display unit
10 light source
10A first light source
10B second light source
20, 20A light guide
30, 30A, 30B, 30C, 30D, 30E light diffusers
40 reflector
50 diffuser plate
60 prism
70 display panel

The invention claimed is:

1. A light source device, comprising:
plural first light sources emitting a first light;
plural second light sources emitting a second light, the second light different from the first light, wherein the first and second light sources are arranged alternately in a direction;
a light guide comprising:
a first main surface;
a second main surface opposed the first main surface; and
a side surface facing the light sources, wherein the light guide receives the first and second lights, and emits the light from the first main surface to exterior; and
plural light diffusers disposed on the second main surface of the light guide, the plural light diffusers comprising:

first light diffusers each of which is located near and in front of each of the first light sources; and second light diffusers each of which is located near and in front of each of the second light sources, wherein the first and second light diffusers are disposed in the direction, and the first diffusers has an absorption rate for the first light higher than that for the second light and the second diffusers has an absorption rate for the second light higher than that for the first light.

2. A display unit comprising:

the light source device according to claim 1 and a display panel facing the first main surface of the light guide of the light source device.

3. The light source device according to claim 1, wherein the first and second lights comprise visible light.

4. The light source device according to claim 1, wherein the light diffusers further comprises third light diffusers disposed between the first diffusers and the second diffusers, wherein the third light diffusers absorb the first light less than the first light diffusers and absorb the second light less than the second light diffusers.

5. The light source device according to claim 4, further comprising a first area, a second area and a third area on the second main surface, wherein the first area comprises the first light diffusers with a first abundance ratio of the first light diffusers located therein, the second area comprises the second light diffusers with a second abundance ratio of the second light diffusers located therein, the third area comprises the third light diffusers with a third abundance ratio of the third light diffusers located therein, and the third abundance ratio is higher than the second abundance ratio.

6. The light source device according to claim 4, wherein the light diffusers further comprises fourth light diffusers disposed between the first diffusers and the second diffusers and at a location further from the side surface than the third diffusers, and the fourth light diffusers absorb the first light and the second light more than the third light diffusers.

7. The light source device according to claim 6, further comprising a fourth area, wherein the fourth area comprises the fourth light diffusers with a fourth abundance ratio of the fourth light diffusers located therein, and the fourth abundance ratio is higher than the third abundance ratio.

8. The light source device according to claim 6, further comprising a fourth area, wherein the fourth area comprises the fourth light diffusers with a fourth abundance ratio of the fourth light diffusers located therein, and the fourth abundance ratio is smaller than the third abundance ratio.

* * * * *